United States Patent [19]
Gueraud et al.

[11] Patent Number: 6,023,120
[45] Date of Patent: *Feb. 8, 2000

[54] METHOD OF MANUFACTURING A CLAW-TYPE MAGNETO-ELECTRIC ROTOR AND ROTOR MANUFACTURED BY A METHOD OF THIS KIND

[75] Inventors: Alain Gueraud, Seichamps; Jean-Charles Mercier, Ludres, both of France

[73] Assignee: Gec Alsthom Moteurs SA, Nancy, France

[*] Notice: This patent is subject to a terminal disclaimer.

[21] Appl. No.: 09/207,604

[22] Filed: Dec. 9, 1998

Related U.S. Application Data

[62] Division of application No. 08/796,551, Feb. 7, 1997, Pat. No. 5,884,389.

[30] Foreign Application Priority Data

Feb. 8, 1996 [FR] France ................................. 96 01550

[51] Int. Cl.⁷ ........................................... H02K 1/22
[52] U.S. Cl. ............................................. 310/263; 29/598
[58] Field of Search .................................. 310/263, 261, 310/156, 218; 29/598

[56] References Cited

U.S. PATENT DOCUMENTS

| | | | |
|---|---|---|---|
| 3,233,866 | 2/1966 | Tiltins | 310/168 |
| 3,321,652 | 5/1967 | Opel | 310/168 |
| 3,571,639 | 3/1971 | Tiltins | 310/168 |
| 4,024,628 | 5/1977 | Crites | 29/598 |
| 4,510,680 | 4/1985 | Miller et al. | 29/598 |
| 4,549,341 | 10/1985 | Kasabian | 29/598 |
| 4,674,178 | 6/1987 | Patel | 29/598 |
| 4,759,116 | 7/1988 | Jones | 29/598 |
| 4,934,579 | 6/1990 | Doble | 228/135 |
| 5,325,009 | 6/1994 | Capion et al. | 310/261 |
| 5,726,517 | 3/1998 | Gueraud et al. | 310/261 |
| 5,786,652 | 7/1998 | Gueraud et al. | 310/263 |

FOREIGN PATENT DOCUMENTS 63-23531  1/1988  Japan.

*Primary Examiner*—Thomas M. Dougherty
*Assistant Examiner*—Joseph Waks
*Attorney, Agent, or Firm*—Sughrue, Mion, Zinn, Macpeak & Seas, PLLC

[57] ABSTRACT

A method of manufacturing a claw-type magneto-electric rotor. The claw type rotor comprising magnetic material parts forming the poles of the rotor and amagnetic material parts separating the poles of opposite polarity confined in a hollow cylindrical casing in the shape of a body of revolution, wherein the casing is made from an amagnetic material. The method includes a step of filling the hollow cylinder with the magnetic material parts and amagnetic material parts and a step of isostatic compression of the combination of these parts and the hollow casing cylinder. Each magnetic or amagnetic material part is made from a plurality of nested, independent, matched and coaxial tube elements each having lateral edges, transverse ends and a lateral face having the exterior shape of the corresponding radial thickness of the magnetic or amagnetic material part concerned.

17 Claims, 7 Drawing Sheets

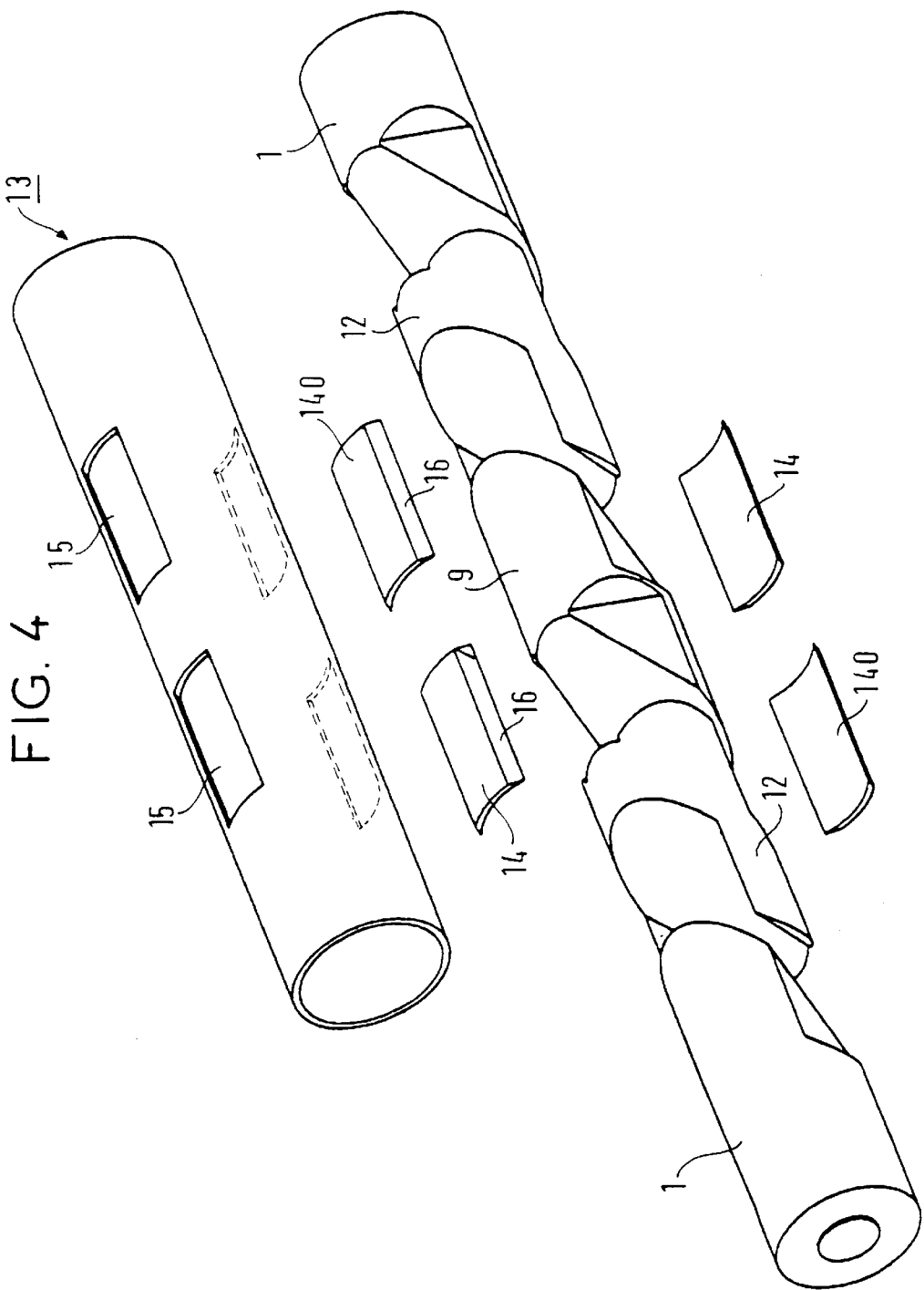

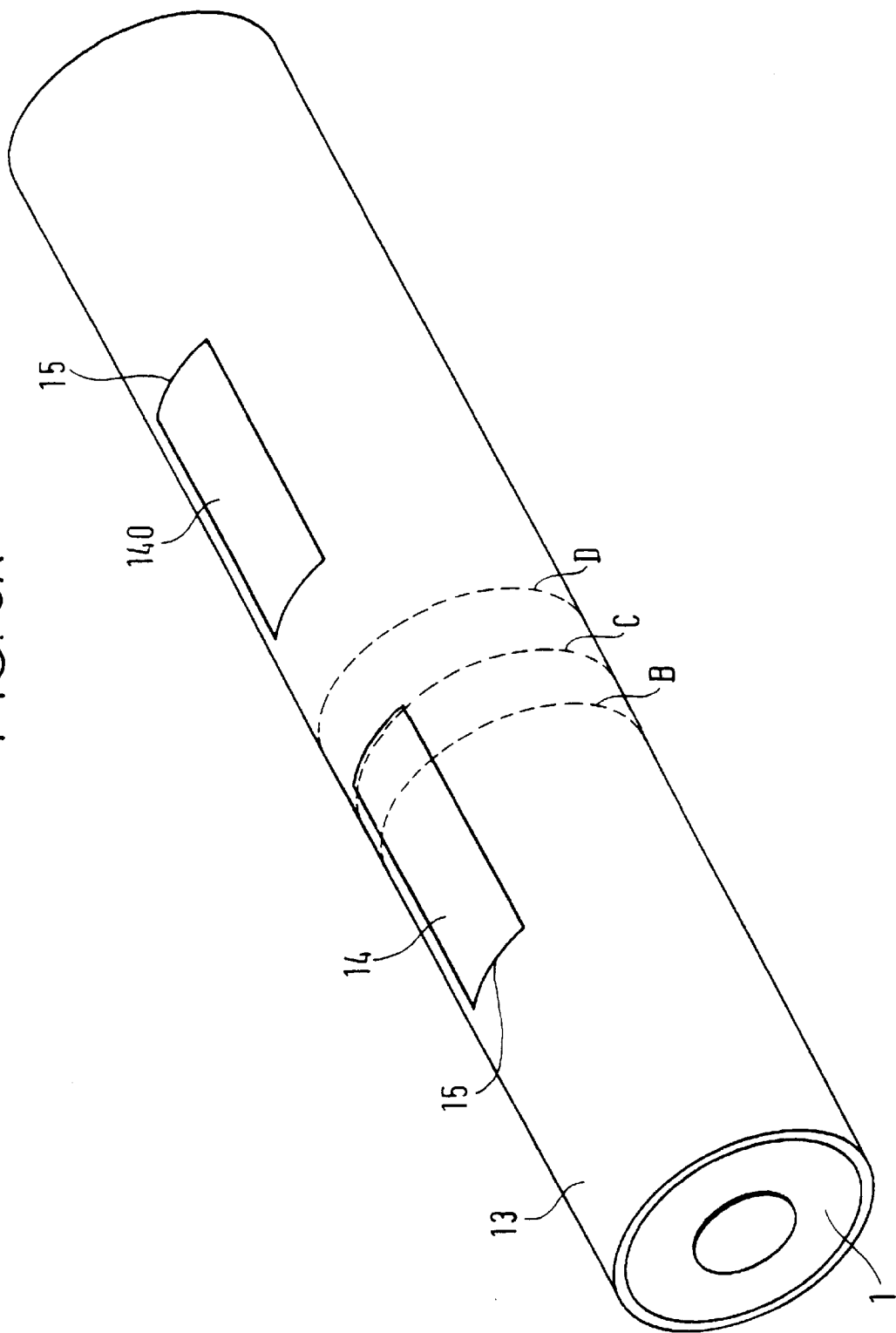

METHOD OF MANUFACTURING A CLAW-TYPE MAGNETO-ELECTRIC ROTOR AND ROTOR MANUFACTURED BY A METHOD OF THIS KIND

This is a divisional of application Ser. No. 08/796,551 filed Feb. 7, 1997, now U.S. Pat. No. 5,884,389 the disclosure of which is incorporated herein by reference.

BACKGROUND OF THE INVENTION

1. Field of the invention

The invention concerns a method of manufacturing a claw-type magneto-electric rotor with claws and a rotor manufactured by a method of this kind. The invention is more particularly concerned with a method of manufacturing a magneto-electric rotor to be used in a high-speed synchronous machine and a claw-type magneto-electric rotor manufactured by this method.

2. Description of the prior art

These claw-type rotors are made up of a plurality of amagnetic and magnetic members fastened-together. The speeds employed in some high-speed synchronous machines can be 50 000 rpm or higher. As indicated hereinabove, these rotors are assemblies of component parts and for this reason manufacturers of claw-type rotors are looking to obtain rotors having the highest possible resistance to centrifugal bursting without sacrificing an optimal aerodynamic profile.

To manufacture solid rotors capable of operating at the speed mentioned above, it is necessary to use assembly techniques of the isostatic compression or similar type if the rotor is to be able to withstand bursting. During rotation, the centrifugal force that is generated is proportional to the moving mass.

Methods known in themselves of manufacturing a claw-type magneto-electric rotor of the type comprising magnetic parts forming the polarized claws of the rotor and amagnetic parts between the claws of opposite polarity, confined within an amagnetic hollow cylindrical casing, comprise a step of filling the amagnetic hollow cylinder with the magnetic and amagnetic parts and a step of isostatic compression of the assembly of the magnetic parts, the amagnetic parts and the hollow casing cylinder.

The use of isostatic compression steps means that the component parts of the rotor must be perfectly assembled. If there are any voids in which there is no material during isostatic compression, the voids are compressed, which generates displacements of the component parts that are prejudicial to the magnetic rating and to the static and dynamic mechanical equilibrium of the rotor obtained.

The least of the resulting problems would be that the rotor would not have the required optimal magnetic characteristics and the worst of these problems would be that the resulting mechanical imbalance would render the rotor unusable.

Furthermore, it is necessary for the claws to have a shape such that the machine has the highest possible efficiency.

For example, the longitudinal face of the magnetic claws facing the stator must advantageously have a progressive magnetic air gap to optimize the passage of magnetic flux between the claws and the stator of the rotating machine.

To give another example, it is necessary to dispose an amagnetic material between two adjacent magnetic masses of opposite polarity (adjacent claws). This amagnetic material limits leakage of the magnetic flux passing directly between two adjacent claws of opposite polarity, rather than passing through the stator.

The shapes of the resulting magnetic and amagnetic parts are complex, and machining them, in particular in order to obtain the tolerances imposed by the use of the isostatic compression treatment, is a long and costly process.

One aim of the present invention is to propose a method of manufacturing magneto-electric rotors of the type described hereinabove in which the machining of the complex magnetic or amagnetic parts is simplified.

SUMMARY OF THE INVENTION

To this end, the invention consists in a method of manufacturing a claw-type magneto-electric rotor comprising magnetic material parts forming poles of the rotor and amagnetic material parts separating poles of opposite polarity, confined, in a hollow cylindrical casing in the shape of a body of revolution and made from an amagnetic material, the method including a step of filling the hollow cylinder with the magnetic material and amagnetic material parts and a step of isostatic compression of the combination of the parts and the hollow casing cylinder, wherein each magnetic or amagnetic material part is made from a plurality of nested, independent, matched and coaxial tube elements each having lateral edges, transverse ends and a lateral face having the exterior shape of the corresponding radial thickness of the magnetic or amagnetic material part concerned.

In one embodiment the amagnetic material hollow cylindrical casing has windows through it, each window being adapted to receive one distal tube element of a magnetic material part.

The windows advantageously have a shape when seen in axial cross-section that is generally convergent from the interior towards the exterior of the cylindrical casing, the distal tube elements having a radius and a radial thickness substantially equal to the radius and the radial thickness of the cylindrical casing and lateral edges complementary to the convergent shape of the windows, the distal tube elements being the first of the tube elements to be positioned in the cylindrical casing during the filling step.

In the method of the invention, following the isostatic compression step, the rotor obtained may be subjected to a finishing step. This finishing step may, for example, consist in axially hollowing out the rotor or giving a particular shape to the external face of the rotor.

The invention also concerns a claw-type magneto-electric rotor of the type comprising magnetic material members forming poles of the rotor and amagnetic material members separating poles of opposite polarity confined in a hollow cylindrical casing in the shape of a body of revolution and made from an amagnetic material manufactured by the method described hereinabove.

In one embodiment the magneto-electric rotor comprises two single-pole magnetic material parts having opposite polarities and an amagnetic material part, each single-pole part comprising a hub of revolution having a radius substantially equal to the inside radius of the cylindrical casing, a free end and a chamfered pole, the chamfered pole having a longitudinal face the same radius as the hub, an oblique transverse face forming the bevel with the longitudinal face and two plane lateral faces that are symmetrical about the plane of symmetry of the beveled pole, converging towards each other in the direction from the longitudinal face towards the oblique face, the plane lateral faces forming transverse shoulders with the hub, the two magnetic material parts being disposed on a common axis with their oblique faces facing towards each other, the amagnetic part being disposed between the oblique faces facing each other and having a shape complementary to the two magnetic material parts so that the set of magnetic or amagnetic material parts constitutes a solid cylinder of revolution having a radius substantially equal to the inside radius of the amagnetic cylinder of revolution casing, the cylindrical casing having two windows through it, each facing the longitudinal face of one of the magnetic material parts, each window being occupied by a magnetic material distal tube element the same polarity as the associated magnetic material part.

In another embodiment, the magneto-electric rotor comprises two magnetic material single-pole end parts of opposite polarity, at least one magnetic material intermediate part and amagnetic material parts, each single-pole part having a hub of revolution having a radius substantially equal to the inside radius of the cylindrical casing, a free end and a beveled pole, the beveled pole comprising a longitudinal face the same radius as the hub, an oblique transverse face forming the bevel with the longitudinal face, and two plane lateral faces symmetrical about the plane of symmetry of the beveled pole, converging in the direction from the longitudinal face towards the oblique face, the plane lateral faces forming with the hub transverse shoulders, the intermediate part(s) comprising two poles of opposite polarity the same shape as the poles of the end parts, each having an oblique face facing the oblique face of the pole of one of the magnetic end parts or the oblique face of one pole of another intermediate part, each pole being separated from the facing pole by an amagnetic part of complementary shape to the two poles so that the set of end parts, intermediate part(s) and magnetic material parts constitutes a solid cylinder of revolution having a radius substantially equal to the inside radius of the amagnetic cylinder of revolution casing, the cylindrical casing having a number of windows through it equal to the number of poles, each window facing the longitudinal face of one of the magnetic material poles, each window being occupied by a magnetic material distal tube element the same polarity as the associated pole.

The transverse shoulders are advantageously at an angle to the plane perpendicular to the rotor axis.

In the minimal embodiment, the magnetic or amagnetic material parts comprise a central solid tube element tangential to the symmetrical plane lateral faces and a hollow tube member having an inside radius substantially equal to the radius of the solid tube member and an outside radius substantially equal to the inside radius of the cylindrical casing.

One advantage of the present invention is the possibility of accommodating the complex shape of the component parts of the rotor by manufacturing a plurality of easily machinable tube elements and joining these tube elements together to produce the complex part.

Another advantage of the present invention results from the principle of nesting the tubes, which provides improved resistance to centrifugal bursting of the rotor.

Other advantages and features of the present invention will emerge from the following description, which is given with reference to the accompanying drawings.

BRIEF DESCRIPTION OF THE DRAWINGS

FIG. 4 is an exploded diagrammatic view of a rotor-in accordance with the invention.

FIG. 5A is a diagrammatic view of an assembled rotor in accordance with the invention.

DETAILED DESCRIPTION OF THE PREFERRED EMBODIMENTS

Figure 1A:
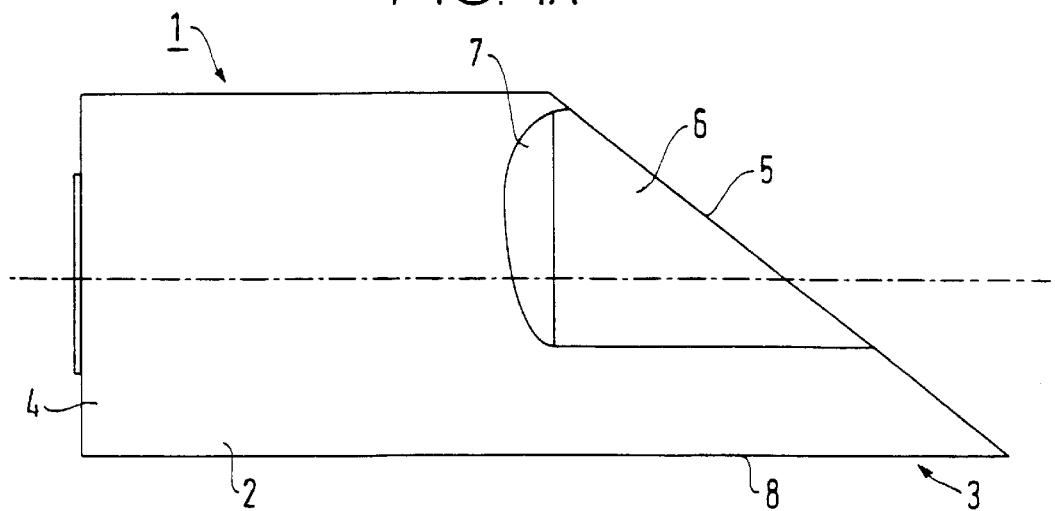
FIG. 1A is a diagrammatic view of a magnetic end part of a rotor in accordance with the invention.

In the following description the terms "longitudinal" and "lateral" concern surface elements that do not intersect the axis of the part in question or of the rotor.

The invention concerns a method of manufacturing a claw-type magneto-electric rotor of the type comprising magnetic material parts 1, 9 forming the poles 3 of the rotor and amagnetic material parts 12 between poles 3 of opposite polarity, confined within an amagnetic material hollow cylindrical casing 13 in the shape of a body of revolution. The method conventionally including a step of filling the hollow cylinder 13 with the magnetic material parts 1, 9 and the amagnetic material parts 12 and a step of isostatic compression of the assembly of said parts 1, 9, 12 and of the hollow cylindrical casing 13.

The parts of this type of solid rotor are complex in shape. Thus, one of the key steps of the method of the invention is that each magnetic material part 1, 9 or amagnetic material part 12 is made from nested, independent, matching and coaxial tube elements 10, 11, 14, 100, 110, 140, 101, 111. Each of the coaxial tube elements 10, 11, 14, 100, 110, 140, 101, and 111 has lateral edges, transverse ends and a lateral face having the exterior shape of the corresponding radial thickness of the magnetic material part 1, 9 or the amagnetic material part 12 concerned.

In one embodiment of the method of the invention, the amagnetic material hollow cylindrical casing 13 has windows 15 passing through it, each window being adapted to receive a magnetic distal tube element 14, 140 of a magnetic material part 1, 9.

As seen in cross-section, the windows 15 advantageously converge from the inside towards the outside of the cylindrical casing 13. The distal tube elements 14, 140, have a radius and a radial thickness substantially equal to the radius and the radial thickness of the cylindrical casing 13. The distal tube elements also have lateral edges 16 complementary to the convergent shape of the windows 15. The distal tube elements 14, 140 are the first of the tube elements 10, 11, 14, 100, 110, 140, 101, 111 positioned in said cylindrical casing 13 during the filling step.

Because of the shape of their lateral edges 16, these distal tube elements 14, 140 enable a progressive air gap to be produced for each pole 3, 30 of the rotor.

Figure 6:
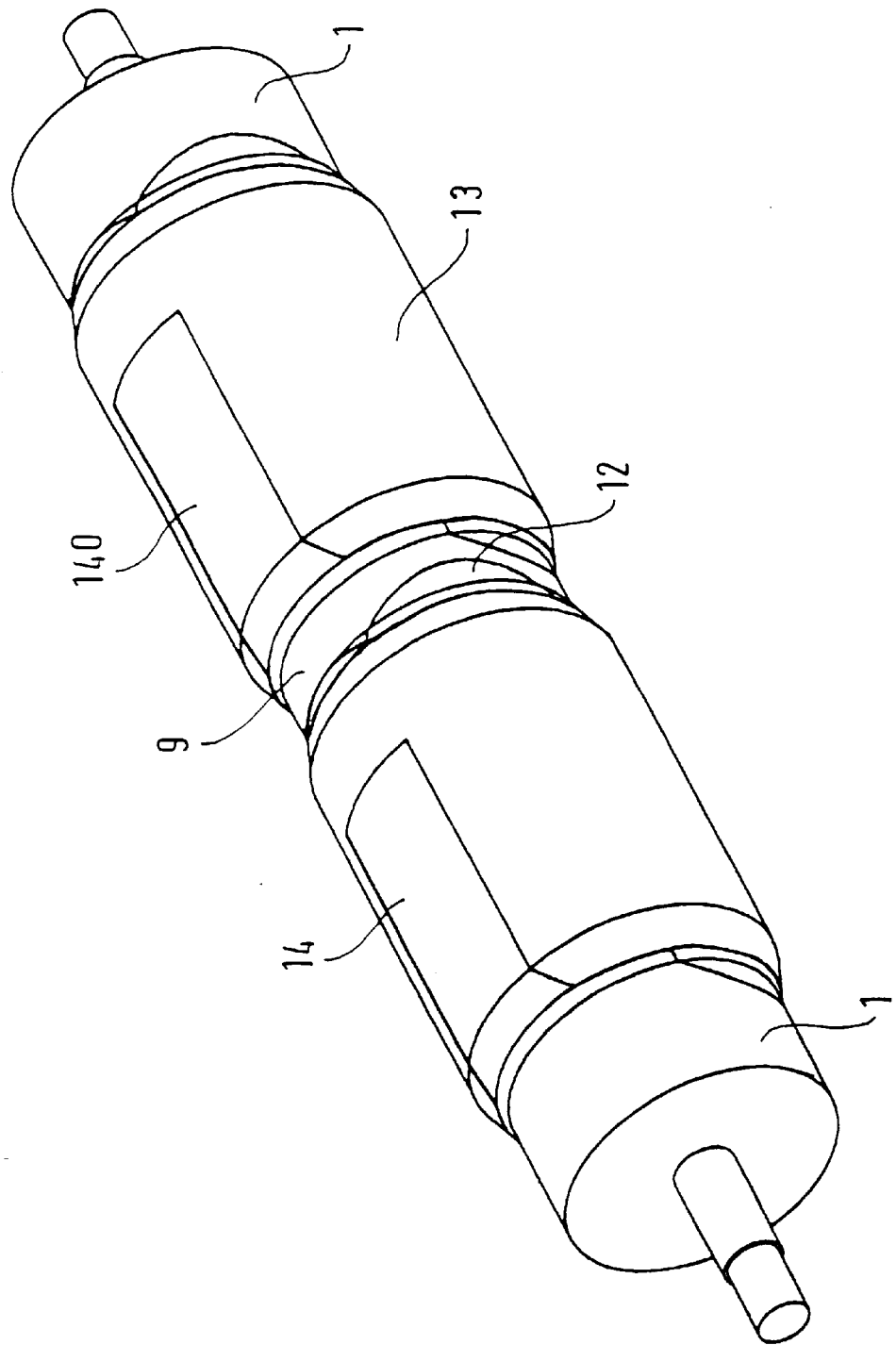
FIG. 6 is a diagrammatic view of a rotor in accordance with the invention after the final machining stage.

In the method of the invention, following the isostatic compression stage, the resulting rotor may be subjected to a finishing stage. This finishing stage may, for example, consist in hollowing out the rotor axially in order to lighten it or to impart a particular shape to the external face of the rotor (FIG. 6).

The invention also concerns a claw-type magneto-electric rotor of the type comprising magnetic material parts 1, 9 forming the poles 3 of the rotor and amagnetic material parts 12 between the poles 3 of opposite polarity, confined within an amagnetic material hollow cylinder of revolution casing 13 which is manufactured by the method as described hereinabove.

In a first embodiment the rotor is a bipolar rotor comprising two magnetic material single-pole end parts 1 of opposite polarity and an amagnetic material part 12.

Each single-pole part 1 (FIGS. 1A, 1B, 1C) comprises a hub of revolution 2 having a radius substantially equal to the inside radius of the cylindrical casing 13, a free end 4 and a beveled pole 3. The beveled pole 3 having a longitudinal face 8 the same radius as the hub 2, an oblique transverse face 5 forming the bevel with the longitudinal face 8, and two plane lateral faces 6, symmetrical about the plane of symmetry of the beveled pole 3, converging in the direction from the longitudinal face 8 to the oblique face 5.

With the hub, the plane lateral faces 6 form transverse shoulders 7.

The two magnetic material parts 1 are disposed on the same axis with their oblique faces 5 facing each other.

Figure 2A:
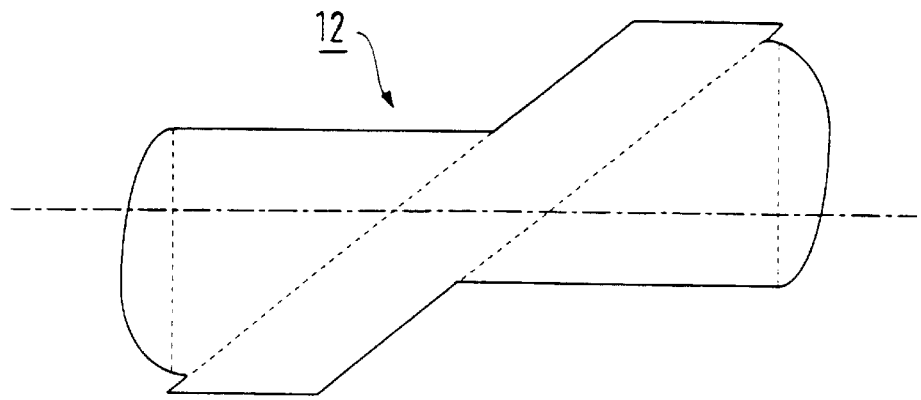
FIG. 2A is a diagrammatic view of an amagnetic part of a rotor in accordance with the invention.
Figure 2B:
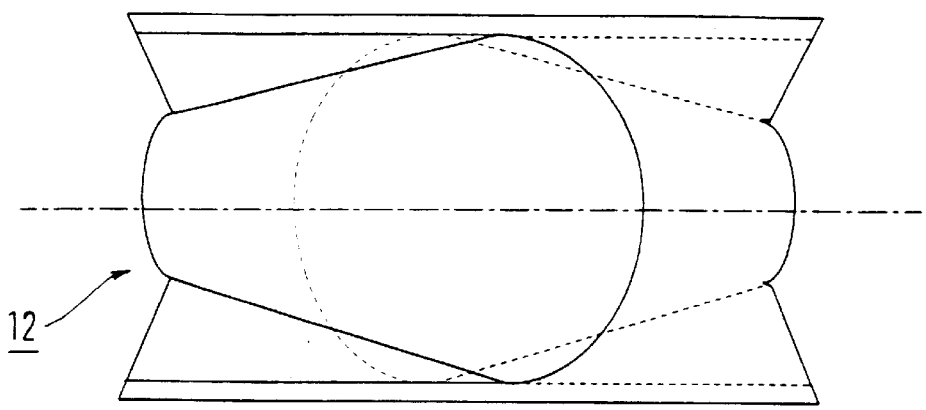
FIGS. 2B, 2C are respectively diagrammatic top and end views of the rotor part shown in FIG. 2A.
Figure 2C:
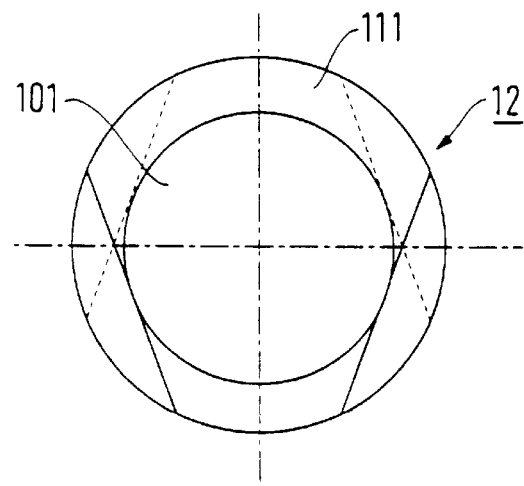

The amagnetic part 12 (FIGS. 2A, 2B, 2C) is disposed between the facing oblique faces 5 and has a shape complementary to the two magnetic material parts 1 so that the combination of the magnetic material parts 1 or amagnetic material parts 12 constitutes a solid cylinder of revolution having a radius substantially equal to the inside radius of the cylinder of revolution amagnetic casing 13.

The cylindrical casing 13 has two windows 15 passing through it, each facing the longitudinal face 8 of one of the magnetic material parts 1. Each window 15 are occupied by a magnetic material distal tube element 14 having the same polarity as the associated magnetic material part 1.

In a second embodiment (shown in FIGS. 4 to 6) the rotor comprises an axial succession of bipolar rotors.

It includes two magnetic material single-pole end pieces 1, at least one magnetic material intermediate part 9 and amagnetic material parts 12. The single-pole end parts 1 are always of opposite polarity.

Figure 1B:
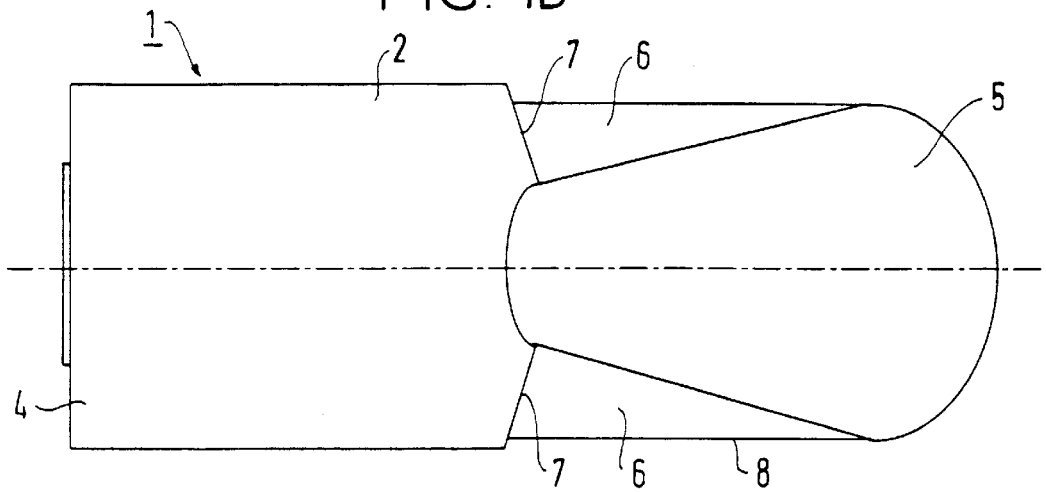
FIGS. 1B, 1C are respectively diagrammatic top and end views of the rotor part shown in FIG. 1A.
Figure 1C:
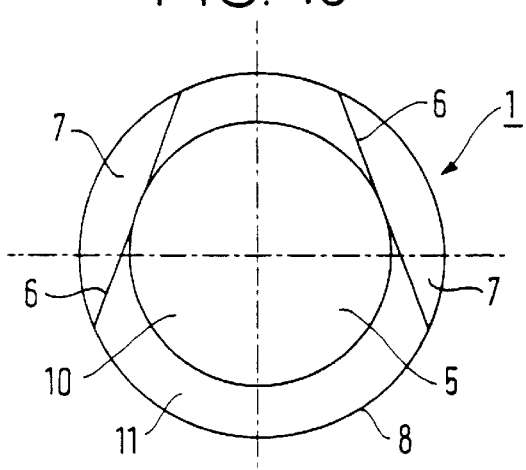

The end parts 1 are the same shape as that described for the first embodiment (FIGS. 1A, 1B, 1C).

Figure 3A:
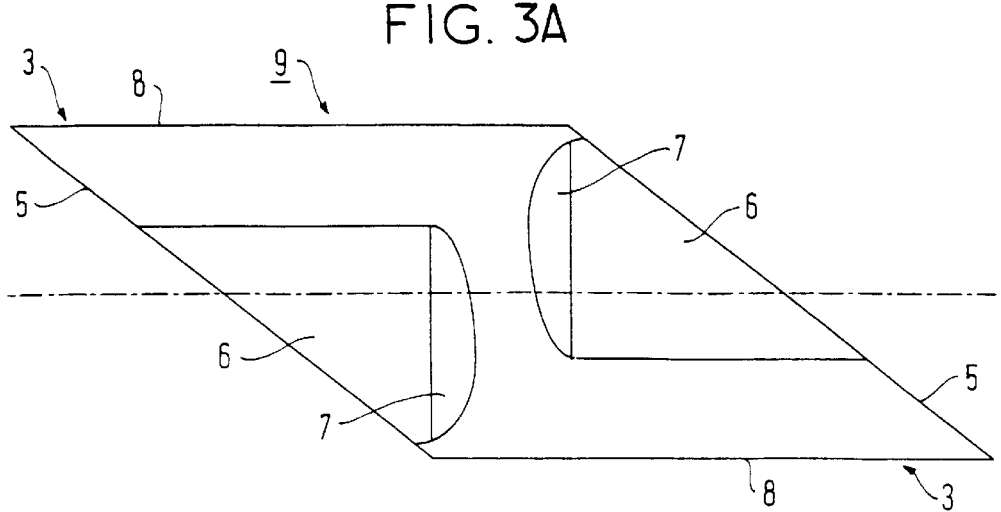
FIG. 3A is a diagrammatic view of a magnetic intermediate part of a rotor in accordance with the invention.
Figure 3B:
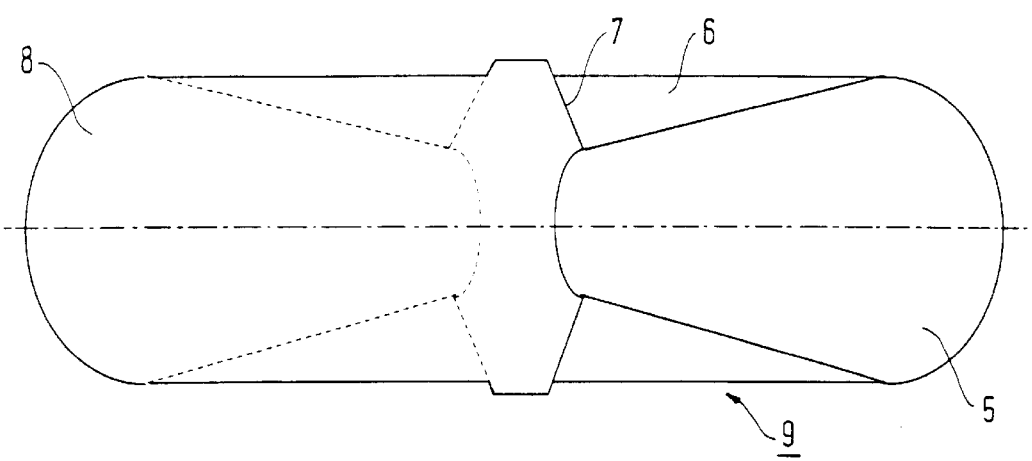
FIGS. 3B, 3C are respectively diagrammatic top and end views of the rotor part shown in FIG. 3A.
Figure 3C:
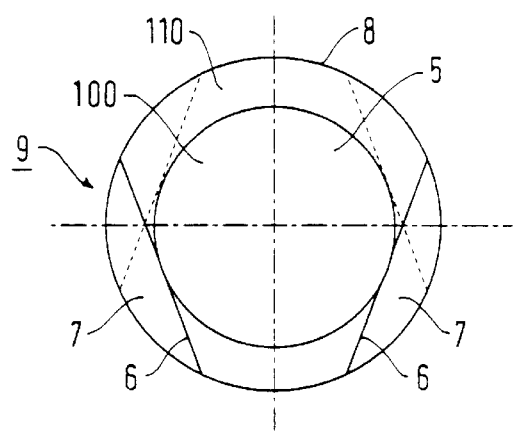

The intermediate part(s) 9 (FIGS. 3A, 3B, 3C) comprises two poles 30 of opposite polarity having the same shape as the poles 3 of the end parts 1.

Each pole 30 of an intermediate part 9 has an oblique face 50 that faces towards the oblique face 5 of the pole 3 of one of the magnetic end parts 1 or the oblique face 50 of one of the poles 30 of another intermediate part 9.

Each pole 3, 30 is separated from the facing pole 30, 3 by an amagnetic part 12 (FIGS. 2A, 2B, 2C) the shape of which is complementary to the two poles 3, 30 so that the assembly of the end parts 1, the intermediate part(s) 9 and the amagnetic material parts 12 constitutes a solid cylinder of revolution having a radius substantially equal to the inside radius of the amagnetic cylinder of revolution casing 13.

As in the first embodiment, the cylindrical casing 13 has the same number of windows 15 through it as there are poles 3.

Each window 15 faces the longitudinal face 8 of one of the magnetic material poles 3, and each window is occupied by a magnetic material distal tube member 14, 140 having the same polarity as the associated pole 3 (FIG. 4).

The transverse shoulders 7 are advantageously at an angle to the plane perpendicular to the rotor axis. The angle is preferable 45o.

Figure 5B:
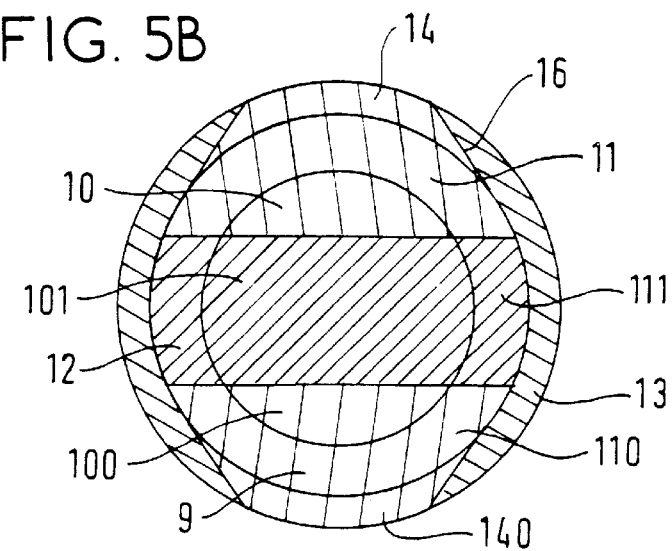
FIGS. 5B, 5C, 5D are respectively diagrammatic cross-sectional views taken along the lines B, C, D in FIG. 5A.
Figure 5C:
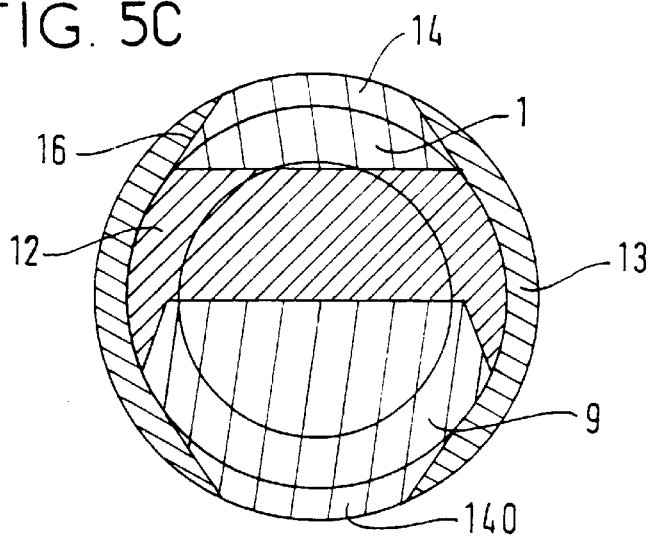
Figure 5D:
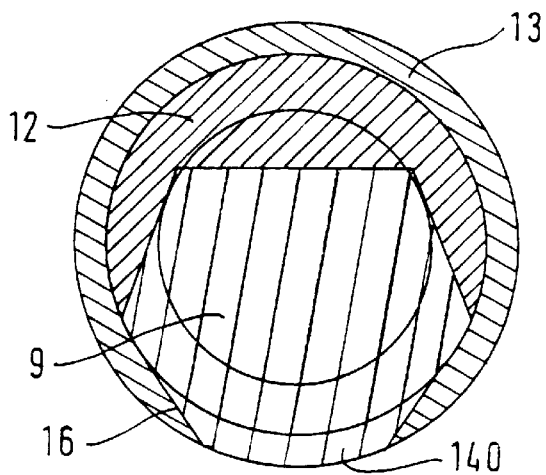

In the embodiment shown, the magnetic material parts 1, 9 and the amagnetic material parts 12 include a central solid tube element 10, 100, 101 tangential to the symmetrical plane lateral faces 6 and a hollow tube member 11, 110, 111 the inside radius of which is substantially equal to the radius of the solid tube member 10 and the outside radius of which is substantially equal to the inside radius of the cylindrical casing 13. Moreover, as previously mentioned, the magnetic material parts include one distal tube element 14, 140 for each pole 3, 30 having an inside diameter and an outside diameter substantially equal to those of the casing cylinder 13. In FIGS. 5B, 5C, 5D, each part is cross-hatched differently and independently of the tube members that constitute it.

The invention is naturally not limited to the embodiments described and shown but is open to many variants that will suggest themselves to the person skilled in the art without departing from the scope of the invention. In particular, without departing from the scope of the invention, more complex multipole parts could be manufactured to obtain a rotor with 2N poles (where N is greater than 1) or a succession thereof.

To give another example, the number of tube elements in each part could be varied without departing from the scope of the present invention.

There is claimed:

1. A magneto-electric rotor, having magnetic material parts forming poles of said rotor and at least one amagnetic material part separating poles of opposite polarity, said magnetic and amagnetic material parts being confined in a hollow cylindrical casing made from an amagnetic material, said hollow cylindrical casing having an inside radius, and said rotor having an axis, said rotor being manufactured as follows:

forming each of said magnetic material parts and said at least one amagnetic material part from a plurality of nested, independent, matching and coaxial cylindrical elements;

filling said hollow cylindrical casing with said magnetic material parts and said at least one amagnetic material part; and isostatically compressing said magnetic material parts and said at least one amagnetic material part together with said hollow cylindrical casing to join together said magnetic material parts, said at least one amagnetic material part, and said hollow cylindrical casing.

2. The magneto-electric rotor as claimed in claim 1, wherein:

said magnetic material parts include two single-pole magnetic material parts having opposite polarities, each of said single-pole parts comprising a hub of revolution having a radius substantially equal to the inside radius of said hollow cylindrical casing, a free end and a chamfered pole, said chamfered pole having a longitudinal face with a radius the same as that of said hub, each of said single-pole parts further comprising an oblique transverse face forming a bevel with said longitudinal face and two plane lateral faces that are symmetrical about a plane of symmetry of said chamfered pole, said two plane lateral faces converging towards each other in a direction from said longitudinal face towards said oblique face, said plane lateral faces forming transverse shoulders with said hub;

said two magnetic material parts are disposed on a common axis with the oblique faces of said two magnetic material parts facing towards each other, said at least one amagnetic material part being disposed between said oblique faces of said two magnetic material parts, said at least one amagnetic material part having a shape complementary to said two magnetic material parts so that the magnetic material parts and the at least one amagnetic material part comprise a solid cylinder of revolution having a radius substantially equal to the inside radius of said hollow cylindrical casing; and said hollow cylindrical casing includes two windows through it, each of said windows facing said longitudinal face of an associated one of said magnetic material parts, each of said windows being occupied by a magnetic material distal tube element having a polarity which is the same as that of the magnetic material part associated with that window.

3. The magneto-electric rotor claimed in claim 2 wherein said transverse shoulders are at an angle to a plane perpendicular to the rotor axis.

4. The magneto-electric rotor claimed in claim 2, wherein each of said magnetic material parts, and said at least one amagnetic material part, is comprised of a central solid cylindrical element tangential to said two plane lateral faces, and a hollow tube member having an inside radius substantially equal to an outside radius of said solid cylindrical element, said hollow tube member further having an outside radius substantially equal to the inside radius of said hollow cylindrical casing.

5. The magneto-electric rotor as claimed in claim 1, wherein:

said magnetic material parts include two magnetic material single-pole end parts of opposite polarity, and at least one magnetic material intermediate part, each of said single-pole end parts having a hub of revolution having a radius substantially equal to the inside radius of said hollow cylindrical casing, a free end and a beveled pole, said beveled pole of each of said single-pole end parts comprising a longitudinal face having a radius the same as that of said hub, an oblique transverse face forming said bevel with said longitudinal face, and two plane lateral faces symmetrical about a plane of symmetry of said beveled pole, said two plane lateral faces converging in a direction from said longitudinal face towards said oblique face, said plane lateral faces forming transverse shoulders with said hub, said at least one intermediate part comprising two poles of opposite polarity, wherein each pole of said intermediate part has a shape which is the same as that of one of said poles of said end parts, said at least one intermediate part having an oblique face facing the oblique face of each one of said magnetic material single-pole end parts;

said at least one amagnetic material part includes at least two amagnetic material parts, each of said amagnetic material parts including a first end having a shape which is complementary to that of the beveled pole of one of said single-pole end parts, and a second end having a shape which is complementary to that of one of the oblique faces of said at least one intermediate part;

the pole of each of said single-pole end parts is separated from a pole of said at least one intermediate part by one of said at least two amagnetic material parts so that the single-pole end parts, the at least one intermediate part and the at least two amagnetic material parts comprise a solid cylinder of revolution having a radius substantially equal to the inside radius of said hollow cylindrical casing; and said hollow cylindrical casing includes a number of windows through it, said number of windows being equal to the number of poles, each of said windows facing an associated longitudinal face of one of said magnetic material poles, each of said windows being occupied by a magnetic material distal tube element having a polarity the same as that of the pole associated with that window.

6. A magneto-electric rotor comprising:

a rotor axis;

magnetic material parts forming poles of said rotor, wherein each of said magnetic material parts is comprised of nested, independent, matching and coaxial cylindrical elements;

at least one amagnetic material part separating poles of opposite polarity, said at least one amagnetic material part being comprised of nested, independent, matching and coaxial cylindrical elements; and a hollow cylindrical casing around said magnetic material parts and said at least one amagnetic material part, said hollow cylindrical casing having an inside, and outside, and an inside radius.

7. The magneto-electric rotor as claimed in claim 6, wherein said at least one amagnetic material part includes a plurality of amagnetic material parts, and each of said amagnetic material parts has a diameter which is the same as that of each other one of said amagnetic material parts.

8. The magneto-electric rotor as claimed in claim 7, wherein each of said magnetic material parts has a diameter which is the same as that of each other one of said magnetic material parts, and each of said diameters of said magnetic material parts is substantially the same as that of said amagnetic material parts.

9. The magneto-electric rotor as claimed in claim 6, wherein each of said magnetic material parts has a diameter which is the same as that of each other one of said magnetic material parts.

10. The magneto-electric rotor as claimed in claim 6, wherein said cylindrical casing is made of an amagnetic material.

11. The magneto-electric rotor as claimed in claim 7, wherein said cylindrical casing has at least one window passing through a side thereof.

12. The magneto-electric rotor as claimed in claim 11, further comprising a distal tube element occupying said at least one window.

13. The magneto-electric rotor as claimed in claim 11, wherein said at least one window includes an opening on the inside of the hollow cylindrical casing and an opening on the outside of the hollow cylindrical casing, wherein the opening on the inside of said hollow cylindrical casing is larger than the opening on the outside of said hollow cylindrical casing.

14. The magneto-electric rotor as claimed in claim 6, wherein:

said magnetic material parts include two single-pole magnetic material parts having opposite polarities, each of said single-pole parts comprising a hub of revolution having a radius substantially equal to the inside radius of said hollow cylindrical casing, a free end and a chamfered pole, said chamfered pole having a longitudinal face with a radius the same as that of said hub, each of said single-pole parts further comprising an oblique transverse face forming a bevel with said longitudinal face and two plane lateral faces that are symmetrical about a plane of symmetry of said chamfered pole, said two plane lateral faces converging towards each other in a direction from said longitudinal face towards said oblique face, said plane lateral faces forming transverse shoulders with said hub;

said two magnetic material parts are disposed on a common axis with the oblique faces of said two magnetic material parts facing towards each other, said at least one amagnetic material part being disposed between said oblique faces of said two magnetic material parts, said at least one amagnetic material part having a shape complementary to said two magnetic material parts so that the magnetic material parts and the at least one amagnetic material part comprise a solid cylinder of revolution having a radius substantially equal to the inside radius of said hollow cylindrical casing; and said hollow cylindrical casing includes two windows through it, each of said windows facing said longitudinal face of an associated one of said magnetic material parts, each of said windows being occupied by a magnetic material distal tube element having a polarity which is the same as that of the magnetic material part associated with that window.

15. The magneto-electric rotor as claimed in claim 6, wherein:

said magnetic material parts include two magnetic material single-pole end parts of opposite polarity, and at least one magnetic material intermediate part, each of said single-pole end parts having a hub of revolution having a radius substantially equal to the inside radius of said hollow cylindrical casing, a free end and a beveled pole, said beveled pole of each of said single-pole end parts comprising a longitudinal face having a radius the same as that of said hub, an oblique transverse face forming said bevel with said longitudinal face, and two plane lateral faces symmetrical about a plane of symmetry of said beveled pole, said two plane lateral faces converging in a direction from said longitudinal face towards said oblique face, said plane lateral faces forming transverse shoulders with said hub, said at least one intermediate part comprising two poles of opposite polarity, wherein each pole of said intermediate part has a shape which is the same as that of one of said poles of said end parts, said at least one intermediate part having an oblique face facing the oblique face of each one of said magnetic material single-pole end parts;

said at least one amagnetic material part includes at least two amagnetic material parts, each of said amagnetic material parts including a first end having a shape which is complementary to that of the beveled pole of one of said single-pole end parts, and a second end having a shape which is complementary to that of one of the oblique faces of said at least one intermediate part;

the pole of each of said single-pole end parts is separated from a pole of said at least one intermediate part by one of said at least two amagnetic material parts so that the single-pole end parts, the at least one intermediate part and the at least two amagnetic material parts comprise a solid cylinder of revolution having a radius substantially equal to the inside radius of said hollow cylindrical casing; and said hollow cylindrical casing includes a number of windows through it, said number of windows being equal to the number of poles, each of said windows facing an associated longitudinal face of one of said magnetic material poles, each of said windows being occupied by a magnetic material distal tube element having a polarity the same as that of the pole associated with that window.

16. The magneto-electric rotor as claimed in claim 14 wherein said transverse shoulders are at an angle to a plane perpendicular to the rotor axis.

17. The magneto-electric rotor claimed in claim 14, wherein each of said magnetic material parts, and said at least one amagnetic material part, is comprised of a central solid cylindrical element tangential to said two plane lateral faces, and a hollow tube member having an inside radius substantially equal to an outside radius of said solid cylindrical element, said hollow tube member further having an outside radius substantially equal to the inside of said hollow cylindrical casing.

* * * * *